United States Patent Office 3,324,148
Patented June 6, 1967

3,324,148
ORGANIC AZIDOFORMATES AND METHODS OF PREPARING SAME
Robert J. Cotter, Bernardsville, N.J., assignor to Union Carbide Corporation, a corporation of New York
No Drawing. Filed June 5, 1963, Ser. No. 285,596
7 Claims. (Cl. 260—349)

This application is a continuation-in-part of copending application Ser. No. 223,237, filed Sept. 12, 1962.

The present invention relates to novel organic azidoformates and methods of preparing same. More specifically, the present invention relates to novel aromatic and cycloaliphatic azidoformates and to a method for their preparation.

The novel organic azidoformates of this invention exhibit high biological activity and are useful as fungicides and bacteriocides; they are represented by the structure:

FORMULA I

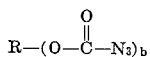

wherein R is an organic radical having at least one cyclic hydrocarbon group present in its structure, and $b$ is an integer equal in value to the valences of R.

The compounds of the present invention are prepared by the reaction of a cyclic organic haloformate with an azide, or lithium azide, or an alkaline earth metal azide, such as calcium azide, magnesium azide, or borium azide, or a quaternary ammonium azide, such as tetramethyl ammonium azide, or the like. This reaction is illustrated by the following reaction diagram:

Reaction A

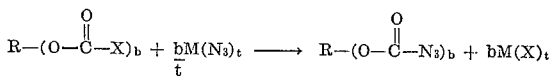

wherein R and $b$ have been heretofore defined, M is an alkali or an alkaline earth metal ion, or a quaternary ammonium ion, X is a halogen, such as fluorine, chlorine, bromine and iodine, and $t$ is an integer equal in value to the valence of the cation (M). For example when M is an alkali metal ion, $t$ is 1, and when M is an alkaline earth metal, $t$ is 2.

It should be noted that the cyclic hydrocarbon moiety R can be substituted by inert substituents. Illustrative of such inert substituents, which can be present on the cyclic hydrocarbon moiety as represented by R are halogen substituents such as fluorine, chlorine, bromine, and iodine, alkyl groups of from 1 to 12 carbon atoms such as methyl, ethyl, propyl, butyl, pentyl, hexyl, decyl, dodecyl and the like; aryl substituents such as tolyl, benzyl and the like; alkoxy substituents such as methoxy, ethoxy, propoxy, butoxy, and the like; aryloxy substituents such as phenoxy and the like; alkylthio substituents such as methylthio, ethylthio, propylthio, hexylthio and the like; and arylthio substituents such as phenylthio, benzylthio and the like.

Reactive substituents which cannot be present in R are those substituents which contain an "active" hydrogen. The reason for this is that such substituents react with the reactants or interfere with the reaction in the preparation of these azidoformates. Illustrative of said reactive substituents are amino, carboxy and sulfonic acid substituents.

In the preparation of azidoformates as illustrated by Reaction A above the reactants can be used in about stoichiometric amounts based on the number of haloformate groups. It is preferred however, to use an alkali metal azide in an amount of from about .9 to about 1.5 mole equivalents per mole of haloformate reacted, based upon the number of haloformate groups. For example, if the haloformate reacted is phenyl haloformate then from about .9 to about 1.5 moles of alkali metal azide would be reacted per mole of phenyl haloformate; but if the halo formate reacted were the bis(haloformate) of hydroquinone then from about 1.8 to about 3 moles of alkali metal azide would be reacted per hole of the bis (haloformate) of hydroquinone.

If, of course, an alkaline earth metal azide were used only one half of the above amounts would have to be used as there would be two azido groups available per molecule of metallic azide. As has been stated however, the alkali metal azides are preferred. This preference is dictated by the fact that the alkali metal azides are more easily prepared, are commercially available and can be handled with a minimum of safety precautions.

The preparation of the azidoformates as illustrated by Reaction A above is generally conducted at a temperature of from about 0° to about 125° C. It is preferred, however, to conduct the reaction at a temperature of from about 25° C. to about 75° C. as the likelihood of decomposition is less.

This reaction can be conducted if desired in the presence of non-aqueous diluents. Such as diluent should be inert to both the reactants and the products. Such diluents should also be "dry" or substantially anhydrous as water reacts with the haloformates reactant in a competing side reaction. It is preferable to select a diluent which is a solvent for both the reactants although this is not necessary. The diluent should, however, be a solvent for the haloformate reactant. Suitable diluents include: diethyl, acetone, benzene, toluene, methyl ethyl ketone, tetrahydrofuran, dioxane, durene, acetonitrile, dimethylacetamide, and dimethyl sulfone.

While it is preferred to conduct this reaction at atmospheric pressure, it can be conducted at sub-atmospheric, or superatmospheric pressure, provided, of course, the appropriate pressure equipment is used.

The azidoformate product

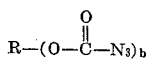

as defined above is recovered from the reaction mixture by suitable conventional means. If the product azidoformate is a liquid, it is preferred to recover it as a residue by distilling off the diluent after removal of the halide salt; if the product azidoformate is a solid, it is preferred to recover it by crystallization.

The haloformate reactants as illustrated by the structure

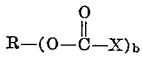

in the Reaction A above, can be prepared through the reaction of a dihalocarbonyl such as phosgene or its corresponding halogen analogs with a hydroxy substituted cyclic hydrocarbon as illustrated by the following general reaction diagram:

*Reaction B*

wherein R, b and X have previously been defined.

The haloformates are generally prepared by sparging phosgene through a solution of the hydroxy substituted cyclic hydrocarbon, heating the solution to reflux and recovering the haloformate by distillation or other conventional means. Catalysts or acid acceptors (for HX) may be used in this reaction, depending on the particular hydroxy compound that is used.

It is contemplated within this invention that R can be any organic radical having at least one cyclic hydrocarbon group present in the structure and preferably where the haloformate groups are bound to carbon atoms of the cyclic group and more particularly to aromatic groups. It is not critical that all of the haloformate groups be attached to the same carbon atom or even to the same cyclic group. For example, the organic radical can be monovalent as when $b$ is 1 or polyvalent when $b$ is 2 or more.

It is also contemplated within this invention that the cyclic hydrocarbon group can be mononuclear or polynuclear or fused ring group either aromatic or cycloaliphatic in nature.

Illustrative of the cyclic hydrocarbon groups in the R group of these compounds are the aromatic radicals containing from 6 to 30 carbon atoms inclusive, such as those represented by the structural formulae:

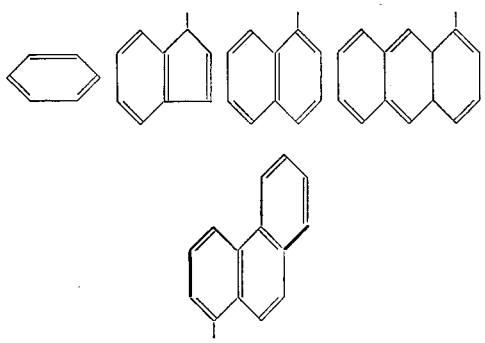

and similar polyvalent rings wherein each of these radicals can be monovalent (as shown) or polyvalent and wherein each can be substituted by inert substituents; the cycloaliphatic hydrocarbon radicals containing from 3 to 30 carbon atoms inclusive, such as those represented by the structural formulae:

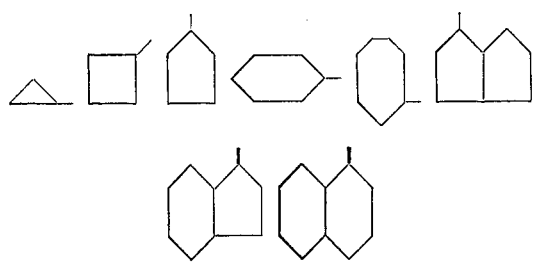

and the like, wherein each of these radicals can be monovalent (as shown) or polyvalent and wherein each can be substituted by inert substituents; the unsaturated cycloaliphatic hydrocarbon radicals containing from 3 to 30 carbon atoms inclusive such as those represented by the formulae:

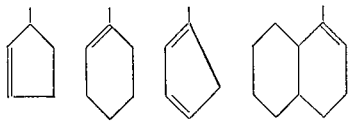

and the like, wherein each of these radicals can be monovalent (as shown) or polyvalent and wherein each can be substituted by inert substituents. Also included are the polyaromatic hydrocarbon radicals containing from 12 to 30 carbon atoms inclusive, such as those represented by the formulae:

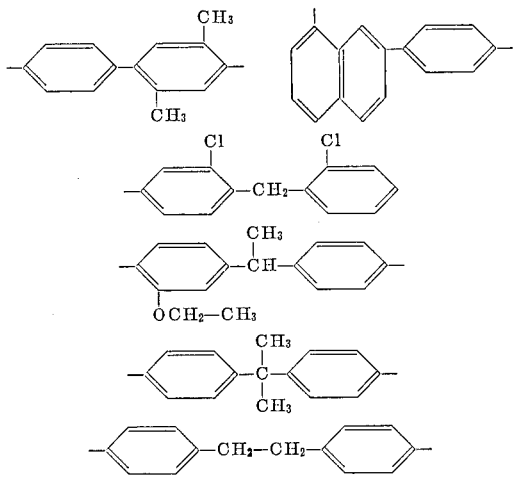

and the like.

Included also within the meaning of the aromatic hydrocarbon radicals, as illustrated above, are: aryl radicals such as phenyl, phenoxyphenyl, chlorophenyl, dichlorophenyl, fluorophenyl, methylthiophenyl, decylphenyl, phenylphenyl, bromophenyl, naphthyl, anthracenyl, phenylene, phenenylene, benzenetetra-yl, and the like; the alkaryl radicals such as tolyl, chlorotolyl, propylthioxylyl, bromoethylphenyl, xylyl, mesityl, ethylphenyl, ethylnaphthyl and the like; aralkyl radicals such as benzyl, iodobenzyl cyclohexoxybenzyl, phenethyl, phenylpropyl, chloronaphthylmethyl, naphthylethyl, naphthylpropyl, and the like.

Included within the meaning of the polyaromatic radicals are arylaryl radicals such as diphenyl, dichlorobiphenyl, methoxydiphenyl, phenylnaphthyl, naphthylphenyl and the like, and arylalkylaryl radicals such as bis(4-phenyl)methane derivatives, 3,4,3',4'-biphenyl derivatives, 4,4'-biphenylene bis-1,2-(3-phenyl)ethane, bis-2,2-(4-phenyl)propane bis(3,4-phenylene)methane, bis-1,1-(3,4-phenylene)ethane, bis-2,2-(3,4-phenylene propane, bis-2,2-(1,2,3,5-benzene)propane and the like.

Included within the term cycloaliphatic radical are: cyclopropyl, chlorocyclopropyl, methylcyclopropyl, methoxycyclopentyl, methylthiocyclohexyl, heptylthiocyclohexyl, phenoxycyclohexyl, dodecylcyclopentyl, cyclobutyl, cyclopentyl, cyclohexyl and the like; any of the totally or partially hydrogenated aromatic radicals illustrated above.

Included within the term poly(cycloaliphatic) radical are the hydrogenated or partially hydrogenated polyaromatic radicals set out above. As stated previously, these radicals may by monovalent or polyvalent.

Also included within the terms polyaromatic hydrocarbon radical, and poly(cycloaliphatic) hydrocarbon radicals are those groups which are composed of two or more aromatic or cycloaliphatic radicals joined by a non-carbon atom such as oxygen, nitrogen, phosphorous, or sulfur, the oxides of sulfur, nitrogen or phosphorous such as

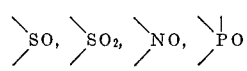

and the like, and those groups which are composed of two aromatic or cycloaliphatic radicals joined by a carbon atom which is bonded to a non-carbon atom such as oxygen or sulfur as a keto or sulfide group.

As has been stated above $b$ is an integer having a value equal to the valence of R. For example, when R is phenyl, $b$ is one; when R is bis(phenylene)propane, $b$ is two; when R is benzene hexa-yl, $b$ is six and so forth. Generally $b$ is an integer having a value of from 1 to 6 inclusive.

The haloformate containing such cyclic groups is reacted with the metallic azide $MN_3$ as shown above in Reaction A. When the haloformate is immediately prepared the haloformate reaction mixture can be reacted with the metallic azide $MN_3$ directly without isolation. While such a procedure might reduce the total yield because of side reactions, the efficiency of the reaction is usually maintained by the elimination of the haloformate recovery step.

The reaction as illustrated in Reaction B above is generally conducted at a temperature from about 0° to about 200° C.

In this reaction (B) phosgene or a halo analog of phosgene is generally used in excess but from about 1 to about 5 mole equivalents of phosgene per mole of hydroxy substituted cyclic hydrocarbon based on the number of hydroxy substituents can be used. Diluents can, and preferably are, used in conducting this reaction; the criteria for selecting a diluent are the same as defined for Reaction A above. Suitable diluents are the same as defined for Reaction A above.

Hydroxy substituted cyclic hydrocarbon reactants as represented by the formula $R(OH)_b$ in the Reaction B above, wherein R and $b$ have been previously defined, include mono- and polyhydroxy substituted aromatic compounds and the mono- and polyhydroxy substituted cycloaliphatic compounds.

Illustrative of the hydroxy substituted aromatic hydrocarbons which can be used as reactants in Reaction B above are phenol, resorcinol, di-hydroxybiphenyl, bis(hydroxyphenyl)methane, bis(hydroxyphenyl)ethane, bis-(hydroxyphenyl)propane, hydroxynaphthalene, dihydroxynaphthalene, hyroxyanthracene, hydroxyphenanthrene, benzyl alcohol, phenylethanol, and the like.

Illustrative of the hydroxy substituted cyclic aliphatic hydrocarbons which can be used as reactants in Reaction B above are cyclopropanol, cyclopropenol, cyclobutanol, cyclopentanol, cyclopentenol, cyclopentanediol, cyclohexanol, cyclohexenol, cyclohexadienol, inositol cyclohexylmethanol, cyclohexylethanol, bis(cyclohexyl)propanol and the like.

As has been stated, the compounds of the present exhibit marked biological activity and have shown to be effective as fungicides, and bacteriocides. Those compounds of the present invention which have exhibited the higher biological activity are those compounds which have the azidoformate groups bound to hydrocarbon atoms which are attached to an aromatic ring. That is to say, those compounds in which the R of Formula I is aryl, i.e. benzyl, naphthyl, anthracenylethyl and the like, and those exhibiting the highest biological activity are those in which the azidoformate radical is connected directly to the aromatic ring. Thus such compounds are preferred for use for such purposes. Those compounds which are cycloaliphatic, i.e. wherein R is cyclohexyl, cyclopentyl, cyclohexylpropyl, and the like exhibit high biological activity but not as high as the aromatic compounds and for that reason the aromatic compounds are preferred as fungicides and bacteriocides.

When the compounds of the present invention are to be utilized as pesticides they can be dispersed and applied by any of the conventional means known to the art.

To facilitate the distribution of the pesticidal compounds disclosed herein, they are preferably applied in conjunction with a diluent or extender. The extender can be either a liquid (usually water) or a powdered solid. For application as dusting compositions the compounds may be so admixed with finely divided solid inert materials as to provide homogeneous free-flowing dusts. The usual pulverized inert materials may be used, preferably talcs, natural clays, pyrophyllite, diatomaceous earth or cotton seed flour or other flours. Other inert solid carriers may be magnesium or calcium carbonates, calcium phosphate, etc., either in powder or granular form. The percent by weight of the essential active ingredient will vary according to the manner in which the composition is to be applied but, in general, will be from about 0.5 to 95 percent by weight of the dust. The preferred percentage range of the active essential ingredient is from 35 to 75 percent by weight based upon the total weight of the dusting composition. The inert carriers may be substituted in whole or in part by other materials which it is desired to apply to the soil, for instance, fertilizers, soil conditioners, and the like.

Liquid pesticidal compositions are preferably applied with water as the extender, the amount of water depending principally upon the convenience of the agriculturist and the type of spraying apparatus which he customarily uses. Sprays which are toxic to fungi can contain from 0.1 to 95 percent by weight of the active essential ingredient based upon the total weight of the spray and preferably contain from 25 to 85 percent by weight of the active essential ingredient based upon the total weight of the spray. Aqueous pesticides are best prepared immediately prior to use to lessen possible hydrolysis.

In the case of aqueous sprays it is desired to have the pesticidal compound in homogeneous dispersion and for this purpose a surface-active agent is preferably used. Substantially any wetting, dispersing or penetrating agent may be used whether anionic, cationic or non-ionic. The preferred concentrates contain the pesticidal compound with from about 0.1 percent to 15 percent by weight of surface-active agent with a sufficient amount of the fungicidal compound to make 100 parts by weight, such compositions then being suitable for admixture with either a solid or a fluid extender. For general use, the weight of surface-active agent will be from 5 percent to 10 percent of the weight of the active ingredient in the concentrate. Suitable surface-active, wetting or dispersing agents may be, for example, sodium and potassium oleates, the amine salts of oleic acid such as morpholine and dimethylamine oleates, the sulfonated animal and vegetable oils such as sulfonated fish oil and castor oil, sulfonated petroleum oils, sulfonated acyclic hydrocarbons, the sodium salt of lignin sulfonic acid, alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products with stearyl alcohol and octylphenol, polyvinyl alcohols, salts, such as the acetate of polyamines from reductive amination of ethylene carbon monoxide polymers, laurylamine hydrochloride, laurylpyridinium bromide stearyltrimethylammonium bromide, cetyldimethylbenzyl ammonium chloride, lauryldimethylamine oxide, and the like.

The compounds contemplated herein may be used with or without "addends," such as those addends which cause the fungicides or bacteriocides to adhere evenly and strongly to plant foliage, such as methyl cellulose, extending materials or diluents, such as the inert materials previously mentioned, which facilitate the measuring of and the application of the small amounts of active materials which are necessary to inhibit the pests.

For purposes of illustration and comparison the following compounds were evaluated as bacteriocides and fungicides as follows:

*Compound I.—Phenylazidoformate*

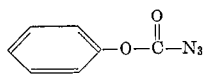

*Compound II.—2,2-Bis[4-(azidocarbonyloxy)phenyl]-propane*

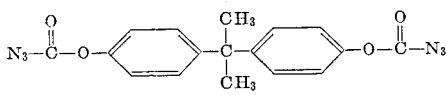

The following test were performed on Compounds I and II:
(a) Bacteriocide Test
(b) Soil Fungicide Test
The following test was also performed on Compound I:
(c) Agar Incorporation Fungicide Test
The procedure for each test appears below:

(a) *Bacteriocide agar incorporation test.*—The test compounds were evaluated against each of the following test organisms:

*Staphylocuccus aureus*
*Bacillus mesentericus*
*Pseudomonas aeruginosa*
*Corynebacterium michiganense*
*Lactobacillus casei*

A nutrient having the following composition:

| | Grams |
|---|---|
| Difco bacto nutrient broth | 8 |
| Difco bacto agar | 15 |
| Distilled water | 1000 | was prepared by adding the solid ingredients to the distilled water and completely dissolving the ingredients by heating.

Eighteen milliliter aliquots of the prepared nutrient were then placed in 50 milliliter Erlenmeyer flasks and sterilized by heating in an autoclave for 20 minutes.

The eighteen milliliter aliquots were then melted in a steam oven and cooled to a temperature of from about 50° C. to about 60° C. and 2 milliliters of each test solution, containing 250 parts per million in distilled water, were added. The flasks were each, well agitated to insure uniform mixing of the nutrient and toxicant and the resulting mixture was then poured into sterile petri dishes, where it was allowed to cool to room temperature, about 23° C.

The nutrient was then inoculated with the test organism by streaking the surface of the nutrient with a presterilized wire which had been dipped into a colony of the test bacteria. The inoculated dishes were incubated for a period of six days at a constant temperature of 20° C. Controls were run in each case.

Each test compound was rated visually according to its ability to inhibit the growth of bacteria by the following designations.

| Rating | Basis |
|---|---|
| 5 | No growth. |
| 3 | Moderate growth. |
| 1 | Severe growth, equal to growth of control. |

(b) *Soil fungicide test.*—The test compounds were evaluated against each of the following test organisms:

*Pythium spendens*
*Rhizoctonia solani*
*Fusarium gladiola*

Soil having the following composition:

| | | |
|---|---|---|
| Degerminated corn meal | cc | 600 |
| Washed white sand | cc | 700 |
| Distilled water | ml | 500 | was prepared by mixing the above ingredients and sterilizing the mixture in an autoclave for 30 minutes at 15 pounds per square inch. The solidified mixture was allowed to cool and was then sliced into 0.75 inch cubes. These cubes were then thoroughly mixed with approximately one pound of sterile soil. This soil mixture was then placed in sterile paper cups.

The soil was inoculated 24 hours prior to testing with cultures one week old.

The toxicant aqueous solution is equivalent in concentration to an application 300 pounds per acre. Thirty milliliters of the toxicant solution is drenched into the infected soil in each of the cups. The treated cups were then incubated for a period of two days at a temperature of 70° F. and a relative humidity of 100 percent.

The compounds were visually rated against each organism according to the following designations.

| Rating | Basis |
|---|---|
| 5 | No growth. |
| 4 | One or two colonies. |
| 3 | Surface ½ covered with colonies. |
| 2 | Surface ¾ covered with colonies. |
| 1 | Growth equal to controls. |

(c) *Agar incorporation fungicide test.*—The test compound was dissolved in an acetone solution of sorbitol laurate, an emulsifying agent. These solutions were then diluted with water to give a test solution having a concentration of 1000 parts per million.

The agar nutrient used had the following composition:

| | Grams |
|---|---|
| Potato dextrose sugar | 45 |
| Bacto agar | 5 |
| Distilled water | 1000 |

This composition was prepared by dissolving the solid ingredients in the distilled water by heating in a steam oven. Eighteen milliliter aliquots of the nutrient solution were placed in 50 milliliter Erlenmeyer flasks and were sterilized by heating in an autoclave for 20 minutes.

The nutrient media aliquots were melted, then cooled to a temperature of from 50° C. to 60° C. and 2 milliliters of the test solution prepared from the selected test compound, was added. The flasks were agitated to insure uniform dispersion and the nutrient media containing the selected test compound was immediately transferred to sterile petri dishes. Media were prepared for the test compound in an amount sufficient to test each organism.

The test was carried out for the following test organisms:

(1) *Fusarium gladiola*
(2) *Aspergillis oryzae*
(3) *Penicillium piscarium*
(4) *Pullularia spendens*
(5) *Saccharomyces cerevisiae*

The agar nutrient, containing the test compound, was inoculated with the test organisms by streaking the nutrient surface with a sterile wire loop which had been dipped into a tube containing a culture of the test organism.

The ability of the compounds to inhibit the growth of fungi was rated according to the following designations:

(5) No growth.
(4) Slight growth.

(3) Moderate growth.
(2) Heavy growth.
(1) Severe growth equal to control.

RESULTS OF BIOLOGICAL TESTS a. Bacteriocide Test    Organism    Rating
Compound I:
    Staphylocuccus aureus _____ 5
    Bacillus mesentericus _____ 5
    Pseudomonas aeruginosa _____ 5
    Corynebacterium michiganense _____ 5
    Lactobacillus casei _____ 5
Compound II:
    Staphylocuccus aureus _____ 5
    Bacillus mesentericus _____ 5
    Pseudomonas aeruginosa _____ 5
    Lactobacillus casei _____ 5 b. Soil Fungicide Test
Compound I:
    Pythium splendens _____ 5
    Phizoctonia solani _____ 5
    Fusarium gladiola _____ 5
Compound II:
    Pythium splendens _____ 5
    Rhizoctonia solani _____ 5 c. Agar Incorporation Fungicide Test
Compound II:
    Fusarium gladiola _____ 5
    Aspergillis oryzae _____ 5
    Penicillium piscarium _____ 5
    Pullularia splendens _____ 5
    Saccharomyces cerevisiae _____ 5

EXAMPLE 1

*Preparation of phenyl azidoformate*

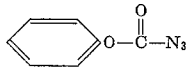

To a solution of 15.66 grams (0.1 mole) of phenylchloroformate in 100 milliliters of dry acetone (dried over anhydrous magnesium sulfate) was added 6.83 grams (0.105 mole) of sodium azide. The resulting mixture was charged to a reflux apparatus and held under reflux for a period of two hours, during which period the mixture was agitated by means of a magnetic stirrer. Upon completion of the reflux period, the reacted mixture was cooled and filtered to remove insoluble salts. Acetone was then removed from the filtrate by distillation under reduced pressure. The liquid residue was then further distilled to yield a fraction boiling at a temperature of from 46° C. to 50° C. at a pressure of 0.05 millimeters of mercury. A yield of 14.41 grams was recovered which amounted to an 88.5 percent yield based upon the phenyl chloroformate used in the reaction.

An elemental analysis of the product gave the following data, calculated for $C_7H_5O_2N_3$.

Carbon:    Percent
    Calculated _____ 51.54
    Found _____ 51.77
Hydrogen:
    Calculated _____ 3.09
    Found _____ 3.02
Nitrogen:
    Calculated _____ 25.76
    Found _____ 25.87

The product, when subjected to infra-red spectroscopic analysis, exhibited intense absorption of radiation having a wave length of 4.55 and 4.65. This is consistent with the structure of phenyl azidoformate. The product had the following physical properties:

Physical state _____ Colorless liquid.
Boiling point, range at 0.05 millimeters
    of mercury _____ 46°–50° C.
Refractive index $n_D^{25}$ _____ 1.5303.

EXAMPLE 2

In a manner similar to that described in example above, the following compounds are prepared by substituting the respective chloroformates for phenyl chloroformates in equivalent amounts as illustrated below.

| Compound Prepared | Chloroformate | Amount of Chloroformate to be used, mole |
|---|---|---|
| 2,4,6-trinitrophenyl azidoformate. | 2,4,6-trinitrophenyl chloroformate. | 0.01 |
| Cyclohexylazidoformate. | Cyclohexylchloroformate. | 0.01 |
| 1,3,5-tris(azidocarbonyloxy) cyclohexane. | 1,3,5-tris(chlorocarbonyloxy)cyclohexane. | 0.033 |
| 1,4-bis(azidocarbonyloxy) benzene. | 1,4-bis(chlorocarbonyloxy)benzene. | 0.05 |
| 1-phenanthrylazidoformate. | 1-phenanthrylchloroformate. | 0.01 |
| 1-anthracenylazidoformate. | 1-anthracenylchloroformate. | 0.01 |
| 2-methylthiocyclopropyl azidoformate. | 2-methylthiocyclopropyl chloroformate. | 0.01 |
| 3-chlorocyclopentyl azidoformate. | 3-chlorocyclopentyl chloroformate. | 0.01 |
| 4-methoxyphenyl-azidoformate. | 4-methoxyphenyl-chloroformate. | 0.01 |
| 2-fluorobenzylazidoformate. | 2-fluorobenzylchloroformate. | 0.01 |
| Benzylazidoformate. | Benzychloroformate. | 0.01 |
| Cyclohexylethylazidoformate. | Cyclohexylethylchloroformate. | 0.01 |

EXAMPLE 3

*Preparation of 2,2-bis[4(azidocarbonyloxy)phenyl]propane*

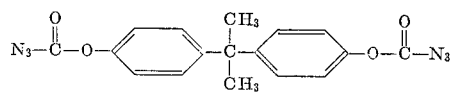

To a solution of 10.6 grams (0.03 mole) of 2,2-bis-(4-chloroformatophenyl)propane in 150 milliliters of dry acetone (dried over anhydrous magnesium sulfate) was added 3.9 grams (0.06 mole) of sodium azide. The resulting mixture was charged to a reflux apparatus and held under reflux for a period of two and one half hours during which period the mixture was agitated by means of a magnetic stirrer. Upon completion of the reflux period the reacted mixture was cooled and filtered to remove innsoluble salts. Acetone was then removed from the filtrate by distillation under reduced pressure. The residue, weighing 11.10 grams was then dissolved in 30 milliliters of diethyl ether. The product, 2,2-bis(4-azidoformatophenyl)propane, was crystallized from the diethyl ether solution. A yield of 8.06 grams was recovered which amounted to a 75.4 percent yield based upon the bis(4-chloroformatophenyl)propane used in the reaction.

An elemental analysis of the product gave the following data, calculated for $C_{17}H_{14}O_4N_6$.

Carbon:    Percent
    Calculated _____ 55.73
    Found _____ 56.28
Hydrogen:
    Calculated _____ 3.85
    Found _____ 4.12
Nitrogen:
    Calculated _____ 22.94
    Found _____ 23.23

An infra-red spectroscopic analysis was consistent with the postulated structure.

The product had the following characteristic physical properties:

Physical state _____ Colorless crystals.
Melting point range _____ 66–69° C.

EXAMPLE 4

*Preparation of 2,2-bis[3,5-dichloro-4-(azidocarbonyloxy)phenyl]propane*

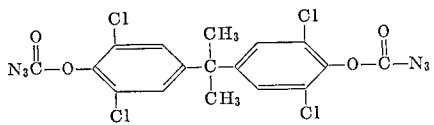

Utilizing the method described in Example 1, 2,2-bis[3,5-dichloro - 4 - (azidocarbonyloxy)phenyl]propane was prepared by reacting 9.82 grams (0.02 mole) of 2,2-bis[3,5 - dichloro - 4 - (chlorocarbonyloxy)phenyl]propane and 2.6 grams of sodium azide in 150 milliliters of dry acetone (dried over anhydrous magnesium sulfate). After isolating the product by the method as described ing Example 2 the product was purified by recrystallization from acetone. A yield of 4.5 grams of product 2,2-bis[3,5-dichloro - 4 - (azidocarbonyloxy)phenyl]propane was obtained.

The product exhibited an infra-red spectrum absorption consistent with the expected for 2,2-bis[3,5-dichloro-4-(azidocarbonyloxy)phenyl]propane.

The product had the following physical properties:

Physical state _____ Colorless crystals.
Melting point (with decomposition) _____ 138° C.

EXAMPLE 5

*Preparation of 1-naphthyl azidoformate*

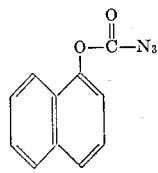

Utilizing the method described in Example 2, 1-naphthyl azidoformate was prepared by reacting 10.3 grams (0.05 mole) of 1-naphthyl chloroformate and 3.42 grams (0.0525 mole) of sodium azide in 100 milliliters of dry acetone. After removing the acetone solvent by the method described in Example 1 the residue product was recovered in an amount of 10.6 grams giving a percentage yield of 100 percent based upon the 1-naphthyl chloroformate used in the reaction.

The product exhibited an infra-red spectrum absorption consistent with that expected for 1-naphthyl azidoformate.

What is claimed is:
1. A compound of the formula:

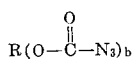

wherein R is active-hydrogen free aromatic hydrocarbyl of from 6 to 30 carbon atoms selected from the group consisting of:
  (a) unsubstituted aromatic hydrocarbyl; and (b) substituted aromatic hydrocarbyl wherein the substituents are selected from the group consisting of halogen, alkyl of from 1 to 12 carbon atoms, alkoxy of from 1 to 4 carbon atoms, tolyl, phenoxy, benzyl, alkylthio of from 1 to 6 carbon atoms, phenylthio and benzylthio; and $b$ is an integer of from one to three inclusive.

2. A compound of the formula:

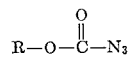

wherein R is unsubstituted aryl of from 6 to 30 carbon atoms.

3. A compound of the formula:

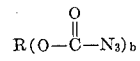

wherein R is unsubstituted arylalkylaryl of from 12 to 30 carbon atoms, $b$ is two, and each azidoformate radical

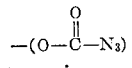

is connected directly to a ring carbon atom of each aryl moiety of said arylalkylaryl.

4. Phenyl azidoformate.
5. 2,2,-bis[4-(azidocarbonyloxy)phenyl]propane.
6. 2,2 - bis[3,5-dichloro-4-(azidocarbonyloxy)phenyl]propane.
7. 1-naphthylazidoformate.

References Cited

UNITED STATES PATENTS

| | | | |
|---|---|---|---|
| 2,225,573 | 12/1940 | Tendeloo | 167—33 |
| 2,392,359 | 1/1946 | Borglin | 167—33 |
| 2,764,599 | 9/1956 | Clifford et al. | 260—349 |
| 2,996,521 | 8/1961 | Matthewes et al. | 260—349 |
| 3,211,752 | 10/1965 | Breslow | 260—349 |

WALTER A. MODANCE, *Primary Examiner.*

NICHOLAS S. RIZZO, NORMA S. MILESTONE,
*Examiners.*

ROBERT T. BOND, *Assistant Examiner.*